W. COLON.
VELOCIPEDE.
APPLICATION FILED APR. 5, 1918.
1,286,539.
Patented Dec. 3, 1918.
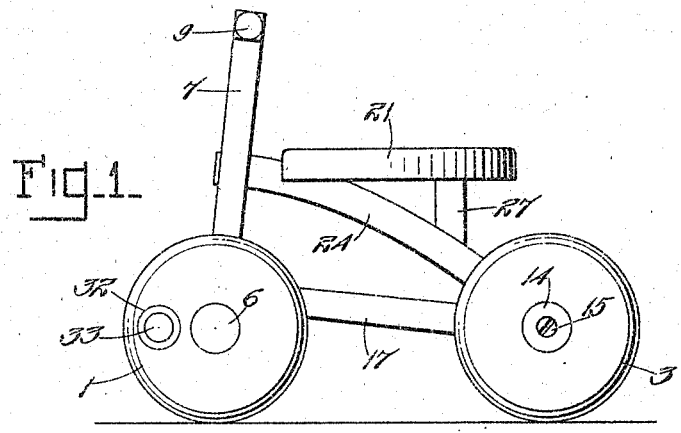
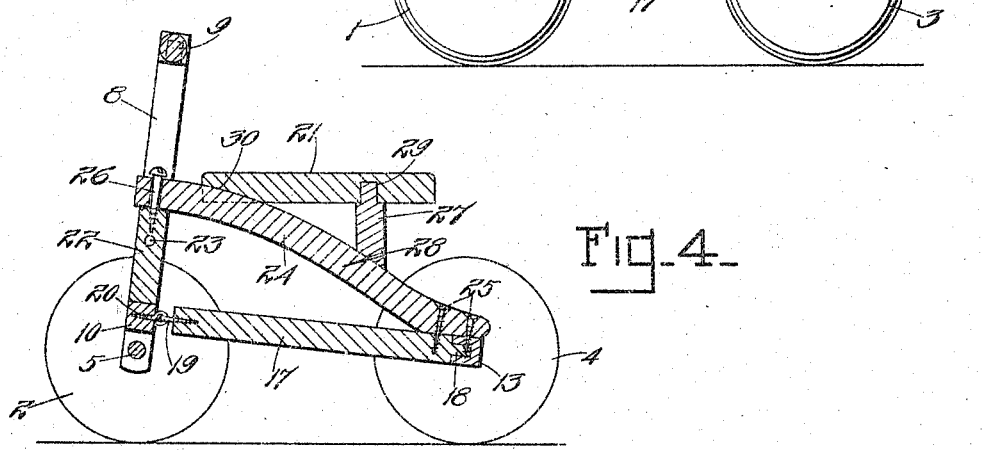
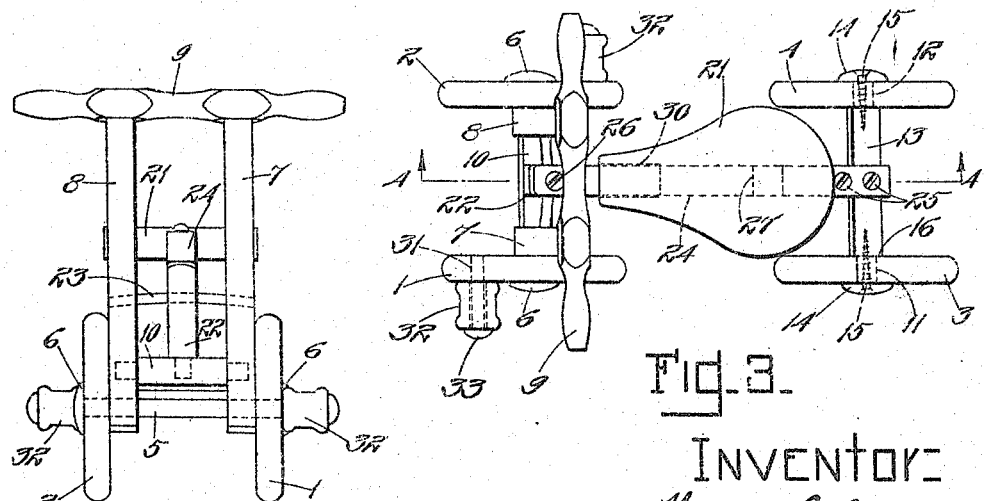
INVENTOR:
Warren Colon
by Macleod, Calver, Copeland & Dike
Attys.

UNITED STATES PATENT OFFICE.

WARREN COLON, OF BOSTON, MASSACHUSETTS.

VELOCIPEDE.

1,286,539.  Specification of Letters Patent.  Patented Dec. 3, 1918.

Application filed April 5, 1918. Serial No. 226,863.

*To all whom it may concern:*

Be it known that I, WARREN COLON, a citizen of the United States, residing at Boston, county of Suffolk, State of Massachusetts, have invented a certain new and useful Improvement in Velocipedes, of which the following is a specification, reference being had therein to the accompanying drawings.

The invention relates to a new and useful improvement in velocipedes. The object of the invention is to provide a velocipede more especially for children which is of simple and cheap construction yet strong and durable and is also perfectly safe for small children. In order to make the velocipede stable as against over-turning it is made with four wheels, namely, two front driving wheels and two rear wheels, each pair being mounted on an axle, the forward or driving wheels being each provided with a pedal which can be readily operated by the rider.

The velocipede is preferably constructed almost entirely of wood, the only metal parts employed being a very small number of screw bolts and screw eyes.

The invention will be fully understood from the following description when taken in connection with the accompanying drawings and the novel features thereof will be pointed out and clearly defined in the claims at the close of this specification.

In the drawings, Figure 1 is a side elevation of a velocipede embodying the invention.

Fig. 2 is a front end view of the device shown in Fig. 1.

Fig. 3 is a plan view.

Fig. 4 is a vertical sectional view on line 4—4 of Fig. 3.

Referring now to the drawings, 1, 2 represent the forward or driving wheels and 3, 4 the two rear wheels all of which are preferably made entirely of wood and solid, being circular disks of solid wood. The two driving wheels 1, 2 are mounted fast on an axle 5 of wood which is driven tight into the central holes through the two wheels so that the axle turns with the wheels. Preferably there is secured to the outer face of each wheel 1, 2 a disk or cap 6 to cover the end of the axle. These caps may be secured in any suitable way either by cement or by a nail or screw driven into the end of the axle. Two upright bars 7, 8 extend upward parallel with each other radially with the wheels 1, 2 the upright bar 7 being adjacent the inner face of the wheel 1 and the bar 8 being adjacent the inner face of the wheel 2, the axle 5 being journaled in or passing loosely through said bars 7, 8 so as to freely turn therein. The upper ends of the two bars 7, 8 are tied together and braced by a cross bar 9 which serves also as a handle bar. Preferably the said upright bars 7, 8 are inclined slightly backward toward the rider instead of being vertical. Preferably the bars 7, 8 are tenoned at their upper ends for engagement with the handle bar. A cross tie bar or brace 10 is secured to the said upright bars 7, 8 a short distance above the axle 5 thus bracing and spacing apart the upright bars and holding them rigid. This cross bar is preferably tenoned into the upright bars, thus requiring no metal parts for uniting the upright bars 7, 8 either with the handle bar 9 or the cross bar 10.

The rear wheels 3, 4 are journaled on the ends 11, 12 of the rear axle 13, said axle being preferably made of wood and of sufficient size so that the journal ends 11, 12 will be sufficiently strong to support the weight that comes upon the axle. In order to hold the wheels 3, 4 upon the rear axle, caps 14, 14 are provided which may be of wood and similar in form to the caps 6, 6 of the forward axle, but instead of being made fast to the wheel so as to turn therewith as in the case of the forward wheels, the caps 14, 14 are made fast to the journal portions 11, 12 of the rear axle 13 but are free from attachment to the wheels themselves so that the wheels may revolve freely on the axles. The preferred form of securing the said caps to the axles consists of screws 15 which screw through the caps into the ends of the axles. The said caps 14 should be set up so that they will hold the wheels 3, 4 closely enough to the shoulder 16 of the larger portion of the axle 13 to prevent movement of the wheels in a lengthwise direction of the axle, yet not clamp them so tight as to make undue friction in the propelling of the velocipede.

The front pair of wheels and the rear pair of wheels are connected by a pole or reach 17, the rear end of the reach being rigidly fast to the rear axle 13, preferably by a tenon connection 18. The connection with the forward pair of wheels is a swivel connection but instead of being connected directly with the axle 5 the connection is made with the cross brace 10 above the axle. The preferred form of connection is by means of two screw eyes 19, 20 one of which is screwed into the end of the reach 17 and the other of which is screwed into the cross bar 10, the two eyes being linked together so as to form a swivel connection.

A seat 21 is provided on a mount at some distance behind the uprights 7, 8 which support the handle bars. The means for supporting the seat 21 is as follows: A post 22 preferably of wood rises from the upper side of the cross brace 10, being rigidly secured to said brace, preferably being tenoned therein. It is further supported by a spindle 23 which passes through a hole in the post 22 the ends of the spindle being made fast in the upright bars 7, 8. A long inclined stringer 24 is made fast at one end to the upper side of the axle 13 and to the reach 17 by any suitable means, as for instance screws 25, 25, the said stringer being inclined upwardly and forwardly, preferably being somewhat curved. The forward end rests on top of the post 22 and is pivotally connected therewith as for instance by a bolt 26, so that when the forward wheels and the upright bars 7, 8 swivel with relation to the reach 17 the stringer 24 will remain in fixed relation to the reach.

A short post 27 is secured to the upper face of the stringer 24 at some distance forward of the rear axle, being secured rigidly to the stringer 24 by any suitable means, the means shown being a pin 28. The upper end of said post supports the rear part of the seat 21, said post preferably being formed with a tenoned end 29 which engages with a slot in the under side of the seat 21, and the forward end of the seat rests upon the forward part of the stringer 24. Preferably the under side of the seat 21 is formed with a groove 30 of the same width as the stringer 24 to fit over the stringer and prevent lateral displacement of the seat. Each of the forward wheels is provided with a pedal which preferably consists of a wooden pin 31 tightly fitted into a hole in the side of the wheel and having a spool 32 loosely mounted on said pin so as to be rotatable thereon, the pin being formed with a head 33 to prevent the spool from sliding off at the end of the pin.

All of the parts of the device are preferably made of wood with the exception of the screw eyes 19, 20 which form a swivel for the forward pair of wheels and the several screws and pins which have been mentioned. It is low hung and the four wheels give perfect stability so that there is no possible danger of over-turning under any reasonable conditions. All parts of the device are simple in form and few in number so that they can be easily assembled as well as repaired in case of breakage.

What I claim is:

1. A velocipede having a pair of forward wheels and a pair of rear wheels, each forward wheel being provided with a pedal, an axle on which the said two forward wheels are fixedly mounted, an upwardly extending frame in the lower end of which the axle of the said forward wheels is journaled, a handle bar mounted on the upper end of said frame, an axle on which the said rear wheels are journaled, a pole having a rigid connection at one end with the axle of the rear wheels, a swivel connection between the forward end of said pole and said forward axle frame, a seat and a support therefor mounted above said pole, said seat support having a rigid connection with the rear axle and a swivel connection with said upright forward frame.

2. A velocipede having a pair of forward wheels and a pair of rear wheels each mounted on an axle, the forward wheels being fast on their axle and the rear wheels being journaled on their axle, each forward wheel being provided with a pedal, an upright frame connected with the forward axle, said frame having two upright bars respectively adjacent the inner faces of the two forward wheels, the axle of the forward wheels being journaled therein, a cross bar rigidly connected with both the said upright bars above the axle of the forward wheels, a handle bar mounted on said upright bars, a pole one end of which is rigidly connected with the axle of the rear pair of wheels and the other end of which is pivotally connected with the said cross bar of the forward frame, a seat supporting bar having one end rigidly connected with the rear axle and extending at an upward inclination between said two upright bars of the forward frame, a post rising from said cross-bar to which the forward end of said seat support is pivoted, and a seat mounted on said inclined bar.

3. A velocipede having a pair of forward wheels and a pair of rear wheels each mounted on an axle, the forward wheels being fast to their axle and the rear wheels being journaled on their axle, each forward wheel being provided with a pedal, an upright frame connected with the forward axle, said frame having two upright bars respectively adjacent the inner faces of the two forward wheels, the axle of the forward wheels being journaled therein, a cross bar rigidly connected with both the said upright bars above the axle of the forward wheels, a handle bar mounted on said upright bars, a pole one end of which is rigidly connected with the axle of the rear pair of wheels and the other end of which is pivotally connected with the said cross bar of the forward frame, an upright post supported by said cross bar between said upright bars and rigidly connected therewith, a seat support having one end rigidly connected with the rear axle and extending at an upward inclination, the forward end of said seat supporting bar being pivotally connected with said upright post, and a seat mounted on the upper side of said seat supporting bar.

4. A velocipede having a pair of forward wheels and a pair of rear wheels each mounted on an axle, the forward wheels being fast on their axle and the rear wheels being journaled on their axle, an upright frame connected with the forward axle, said frame having two upright bars respectively adjacent the inner faces of the two forward wheels, the axle of the forward wheels being journaled therein, a cross bar rigidly connected with both the said upright bars above the axle of the forward wheels, a handle bar mounted on said upright bars, a pole one end of which is rigidly connected with the axle of the rear pair of wheels and the other end of which is pivotally connected with the said cross bar of the forward frame, a seat supporting bar having one end rigidly connected with the rear axle and extending at an upward inclination between said two upright bars of the forward frame, a post rising from said cross bar to which the forward end of said seat support is pivoted, and a seat mounted on said inclined bar, each of the forward wheels being provided with a pedal, said pedals each consisting of a peg mounted fast in the face of the wheel in an eccentric position and having a rotatable spool mounted thereon.

5. A velocipede having a pair of forward wheels and a pair of rear wheels, each forward wheel being provided with a pedal, an axle on which the said two forward wheels are fixedly mounted, an upwardly extending frame in the lower end of which the axle of the said forward wheels is journaled, a handle bar mounted on the upper end of said frame, an axle on which the said rear wheels are journaled, a pole having a rigid connection at one end with the axle of the rear wheels, a swivel connection between the forward end of said pole and said frame, a seat and a support therefor mounted above said pole, said seat support having a rigid connection with the rear axle and a swivel connection with said forward frame, said wheels, frame work and axles being made of wood, the axles extending through the wheels and having caps on the outer ends of the axles.

6. A velocipede having a pair of forward wheels and a pair of rear wheels each mounted on an axle, the forward wheels being fast on their axle and the rear wheels being journaled on their axle, each forward wheel being provided with a pedal, an upright frame connected with the forward axle, said frame having two upright bars respectively adjacent the inner faces of the two forward wheels, the axle of the forward wheels being journaled therein, a cross bar rigidly connected with both the said upright bars above the axle of the forward wheels, a handle bar mounted on said upright bars, a pole one end of which is rigidly connected with the axle of the rear pair of wheels and the other end of which is pivotally connected with the said cross bar of the forward frame, said pivot connection consisting of two screw eyes linked together one of which is screwed into said pole and the other of which is screwed into the said forward frame, a seat supporting bar having one end rigidly connected with the rear axle and extending forward at an upward inclination between said two upright bars of the forward frame, a support connected with said frame to which the forward end of said seat support is pivoted, said pivot connection consisting of a screw bolt which passes loosely through said seat supporting pole and is screwed into the frame support, and a seat mounted on said inclined bar.

In testimony whereof I affix my signature.

WARREN COLON.

Copies of this patent may be obtained for five cents each, by addressing the "Commissioner of Patents, Washington, D. C."